United States Patent [19]
Patitsas et al.

[11] Patent Number: 6,015,525
[45] Date of Patent: Jan. 18, 2000

[54] TIRE CURE BLADDER COMPOSITION WITH ALKYLPHENOXYPOLY (ALKYLENEOXY) ALKANOL

[75] Inventors: George Philemon Patitsas, Kent; Paul Harry Sandstrom, Tallmadge, both of Ohio

[73] Assignee: The Goodyear Tire & Rubber Company, Akron, Ohio

[21] Appl. No.: 09/145,931

[22] Filed: Sep. 3, 1998

[51] Int. Cl.[7] .......................... B29C 35/00; C08F 210/08
[52] U.S. Cl. .......................... 264/315; 249/65; 264/326; 425/43; 425/52
[58] Field of Search ...................... 264/130, 131, 264/315, 326; 156/401; 425/35, 39, 43, 52; 249/65

[56] References Cited

U.S. PATENT DOCUMENTS

| | | |
|---|---|---|
| 3,932,088 | 1/1976 | Harada et al. . |
| 5,538,218 | 7/1996 | Patitsas et al. . |
| 5,593,701 | 1/1997 | Graves et al. . |
| 5,728,311 | 3/1998 | Patitsas et al. . |

OTHER PUBLICATIONS

Butyl and Chlorobutyl™ Rubber (Chapter 10) pp. 249–273 of *Rubber Technology*, 2$^{nd}$ Ed., edited by Maurice Morton, published by Robert E. Krieger Publishing Co., Malabar, Florida 1973.

Trade Literature from Exxon Chemical Co., Houston, Texas, apparently published Oct. 1993, consisting of 68 printed pages including general fliers, specification sheets, and tire curing bladder recipes, all related to Exxpro™ products.

Trade Literature titles IGEPAL® Nonionic Surfactants published by Rhone–Poulenc: Cranbury, New Jersey, apparently published Mar. 1997, consisting of 11 pages of sales and technical data on IGEPAL® surfactants.

Trade Literature titles IGEPAL® CA Nonionic Surfactants published by Rhone–Poulenc: Cranbury, New Jersey, apparently published Mar. 1997, consisting of 6 pages of sales and technical data on IGEPAL® surfactants.

*Primary Examiner*—Mathieu D. Vargot
*Attorney, Agent, or Firm*—Henry C. Young, Jr.

[57] ABSTRACT

Disclosed are expandable bladders for use in curing presses for rubber compositions such as pneumatic tires. The bladders are a crosslinked elastomer comprising an isobutylene rubbery polymer. The bladder composition includes alkylphenoxypoly(alkyleneoxy)-alkanol which improves the release characteristics of the cured bladder from a tire innerliner cured in contact with said bladder. The improved release characteristics allow rubber compositions such as tires to be molded with fewer defects caused during release of the bladder from the tires or caused by abraded or deformed bladders. The use of alkylphenoxypoly (alkyleneoxy)alkanol also increases the useful life time of the bladder allowing more tires to be cured without changing bladders.

11 Claims, No Drawings

TIRE CURE BLADDER COMPOSITION WITH ALKYLPHENOXYPOLY (ALKYLENEOXY) ALKANOL

FIELD OF INVENTION

This invention relates to tire curing bladder having dispersed therein alkylphenoxypoly(alkyleneoxy)alkanol. The preferred rubbers of the bladder may include polymers of isobutylene such as butyl rubber and halogenated butyl rubbers. Copolymers of paraalkylstyrene and isobutylene and/or halogenated copolymers of paraalkylstyrene and isobutylene are less preferred and optionally excluded. It also relates to a method of curing tires utilizing such a bladder.

BACKGROUND OF THE INVENTION

Conventionally pneumatic rubber vehicle tires are produced by molding and curing a green (uncured) partially shaped tire in a molding press. The green tire is pressed outwardly against a mold surface (sometimes called a negative mold surface) by means of an inner fluid-expandable bladder (cure bladder). By this method the green tire is shaped against the outer mold surface which defines the tire tread pattern and configuration of the sidewalls. By application of heat and pressure the tire is molded and cured at elevated temperatures.

In general practice, the expansion of the bladder is accomplished by application of internal pressure to the inner bladder cavity which is provided by a fluid such as a gas, hot water and/or steam which also may participate in the transfer of heat for the curing or vulcanization of the tire. The tire after molding and curing is allowed to cool somewhat in the mold, sometimes aided by adding cold or cooler water supplied to the bladder. Then the mold is opened, the bladder is collapsed, including release of its internal fluid pressure, and the tire is removed from the tire mold. Such use of tire curing bladders is well known to those having skill in the art.

It is recognized that there is relative movement between the outer contacting surface of the bladder and the inner surface of the uncured tire during the expansion phase of the bladder. Likewise, there is relative movement between the outer contacting surface of the bladder and the cured inner surface of tire during the collapse of the bladder and the stripping of the bladder from the cured tire after the tire has been molded and cured (vulcanized).

The bladder surface can tend to stick to a inner surface of the cured tire during the bladder collapsing part of the tire cure cycle. This adhesion may cause roughening of the bladder surface or of the inner surface of the tire. This reduces bladder durability and can produce defective tires. For this reason, it is conventional practice to precoat the inner surface of the uncured tires or the outer surface of the bladder with a lubricant before tire molding in order to enhance lubricity between the outer bladder surface and inner tire surfaces during the entire molding operation. This lubricant has also been called a bladder lubricant, and is often a silicone polymer dispersed in a solvent or water.

It is to be appreciated that the release of the cured tire from its cure bladder in an industrial manufacturing setting is intimately associated with both the phenomenon of release (to prevent sticking or adhesion) and the phenomenon of lubrication (to enhance slipping) between the bladder and the adjacent tire surfaces.

Butyl rubber is commonly used in tire curing bladders. Butyl rubber is a copolymer of predominantly isobutylene with small amounts of diene monomers, usually isoprene to give sufficient unsaturation to allow the butyl rubber to be crosslinked. Copolymers of isobutylene and paramethylstyrene which are subsequently brominated are being manufactured by Exxon. These polymers are useful in many applications where butyl rubber is used. Oils such as castor oil, naphthenic and other aromatic oils have been used in cure bladders to plasticize (make more easily deformable) the composition and cured articles (bladders) therefrom.

Accordingly, it is desired to provide curing bladders with decreased adhesion to cured tires.

SUMMARY OF THE INVENTION

This invention relates to a curing press of the type which uses an expandable bladder to assist in shaping and curing rubber compositions. The incorporation and dispersion of alkylphenoxypoly(alkyleneoxy)alkanol into curing bladder formulations from copolymers from isobutylene and subsequent crosslinking of the rubbers of the bladders was found to significantly lower adhesion of the innerliners of a cured tire to said curing bladders. Isobutylene polymers are generally at least 50 weight percent of the total rubbery polymers of said curing bladders.

DETAILED DESCRIPTION

The mono or poly(alkyl)phenoxypoly(alkyleneoxy) alkanols useful in bladder compositions are commercially available as nonionic surfactants from a variety of manufacturers such as Rhône-Poulenc in Cranbury, N.J. The first alkyl can have from about 6 to 12 carbon atoms, more preferably from 8 to 10 carbon atoms and is preferably octyl or nonyl. While one alkyl substituent on the phenoxy is preferred, the compound may have two or more alkyl substituents on the phenol. The alkyleneoxy desirably has 2 or 3 carbon atoms per repeat unit i.e. ethyleneoxy or propyleneoxy. The number of alkyleneoxy repeat units in the surfactant can vary from an average of 1½ to about 40, more desirably from 5 to 30, and preferably from about 7 to about 12. The final alkanol group is desirably ethanol or propanol. These are surfactants as one portion of the molecule (alkylphenoxy) is relatively hydrophobic while the other end poly(alkyleneoxy)alkanol is relatively hydrophilic. The alkylphenoxypoly (alkyleneoxy)alkanols can also be characterized by their wt % alkylene oxide which may vary from about 24 to about 90, more desirably is from about 50 to about 87, and preferably is from about 60 to about 73. The HLB (hydrophile-lipophile balance) may vary from about 4.8 to about 18, desirably is from about 10 to about 17.4, and preferably is from about 12 to about 14.6. The surfactants can be represented as follows:

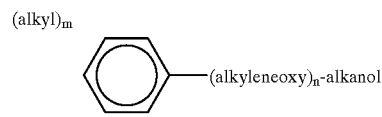

where alkyl, alkyleneoxy, and alkanol are as described above, m is from 1 to 5, preferably 1 or 2 and n is the number of alkyleneoxy repeat units described above. Desirably alkyl and an alkyleneoxy substituent on the benzene ring are para to each other.

The alkyphenoxypoly(alkyleneoxy)alkanols are different than conventional poly (ethylene oxides) without the alkylphenoxy groups in that the poly (ethylene oxide) without alkylphenoxy groups are significantly less compatible with the butyl rubber of the bladder. The difference in compatibility can be better understood by reviewing the solubility tables from Rhône-Poulenc's Igepol™ CA and CO surfactants. The surfactants are soluble in mineral oil, kerosene, and xylene when the weight % poly(ethyleneoxy) is low but become insoluble when the weight % poly(ethyleneoxy) becomes high. It is anticipated that the alkylphenoxy group in the alkylphenoxypoly(alkyleneoxy)alkanol serves two functions in the present invention. The first is to solubilize the alkylphenoxypoly(alkyleneoxy)alkanol in the bladder composition and the second is to anchor the alkylphenoxypoly(alkyleneoxy)alkanol molecule to the cured bladder. It is anticipated that the alkylphenoxypoly(alkyleneoxy)alkanol molecule may have a tendency to bleed to the surface of the bladder. Anchoring of said molecule to the bladder prevents or slows the removal of said molecule from the surface of the bladder to the surface of the cured tire.

The alkylphenoxypoly(alkyleneoxy)alkanol is anchored by the physical interaction of the alkylphenoxy group with the butyl rubber of the cure bladder. No chemical bond between the alkylphenoxypoly(alkyleneoxy)alkanol and the butyl rubber is expected or necessary. Thus, desirably less than 5 weight percent and more desirably less than 0.1 or 1 weight percent of the alkylphenoxypoly(alkyleneoxy) alkanol is chemically bonded to the butyl rubber or any other rubber of the cure bladder.

The amount of alkylphenoxypoly(alkyleneoxy)alkanol in the bladder composition is an amount sufficient to measurably change the Hot Peel Adhesion value. Desirable amounts are from about 1 to about 20 PHR, more desirably from about 2 to about 15 PHR, and preferably about 3 to about 10 PHR. The alkylphenoxypoly(alkyleneoxy)alkanol is added to and dispersed in the rubber of the bladder composition before curing of the bladder. Due to the interfacial activity of the alkylphenoxypoly(alkyleneoxy)alkanol it may be preferentially located at the surface of the cured bladder. The term PHR refers to parts by weight per one hundred parts by weight total rubber in a rubber composition. The term PHR is a standard term used by most rubber formulators as it facilitates formulation changes and comparisons when all ingredients are measured in relation to one hundred parts by weight of the rubber rather than the total formulation weight. Rubbers or rubbery polymers for the purposes of this application are crosslinkable, predominantly noncrystalline polymers with Tg values of the predominant components on a weight basis being below 0° C. and preferably below −20° C.

Desirably the rubbery polymers are at least 50 weight percent, more desirably at least 75 or 80 weight percent and preferably at least 90 or 95 of at least one isobutylene rubbery polymer having at least 50 weight percent repeating units from isobutylene. Desirably at least 70 and preferably at least 80, 85 or 90 weight percent of the repeating units of the rubbery polymer are derived from isobutylene. Polymer is used to mean homopolymers and copolymers. Copolymer is used herein to mean a polymer from 2 or more monomers.

A less preferred rubbery polymer for this application is a copolymer comprising repeating units from an isoolefin and paraalkylstyrene, preferably brominated. The isoolefins may have from 4 to 7 carbon atoms (e.g. isobutylene). If the isoolefin is isobutylene the copolymer is an isobutylene rubbery polymer. The alkyl ofparaalkylstyrene may have from 1 to 11 carbon atoms. Desirably, the paraalkylstyrene is 80, 90, or 95 weight percent or moreparamethylstyrene. Desirably the copolymer is from 1 to 20 weight percent paramethylstyrene, and more desirably from 2 to 15 weight percent paramethylstyrene. Desirably the copolymer is from 80 to 99 weight percent isobutylene and more desirably from 85 to 98 weight percent.

Desirably the above copolymer is a halogenated (e.g. brominated) copolymer with a halogen (e.g. bromine) content up to 5 weight percent and preferably from about 0.2 to about 1.5 or about 2.5 weight percent in the copolymer. Halogenation with other halogens (e.g. chlorine) is less preferred. Conjugated diene monomers having 4 to 8 carbon atoms may optionally be present in amounts up to 5 or 8 weight percent, and more desirably from 0.5 to 3 weight percent of the copolymer. These brominated copolymers are less preferred as U.S. Pat. No. 5,593,701 teaches that these copolymers can graft to polyethers, polylactones and polyesters and be used in curing bladders.

An example of a brominated butyl rubber is sold under the Exxpro™ trademark with a Mooney Viscosity ML (1+8) 125° C. of 50 plus or minus 10, an isobutylene content of 94 or 95 weight percent, and aparamethylstyrene content of about 5 weight percent, with a total bromine content of 0.8 weight percent. European Patent Application Publication No. 0,344,021 describes how to make the above polymers and is hereby incorporated by reference. Exxpro™ polymers are available from Exxon.

A preferred isobutylene rubbery polymer for bladder and this application is a copolymer from isobutylene and one or more conjugated dienes having from 4 to 8 carbon atoms, preferably isoprene. Desirably, the conjugated diene (e.g. isoprene) is present from 1 to 5 or 10 weight percent and the remainder (e.g. from 90 or 95 to 99 weight percent) is isobutylene and optionally a halogen. These copolymers from isobutylene and conjugated dienes may include butyl rubber and halogen substituted butyl rubbers such as chlorobutyl and bromobutyl rubbers. In preferred embodiments at least 80, 90, or 95 weight percent of all the rubbery polymers in the bladders are these butyl rubbers which are without brominated para-methylstyrene. Alternatively at least 80, 90, or 95 weight percent of all the repeating units of the rubbers of the bladder are from isobutylene with the remainder of up to 5, 10, or 20 weight percent of the repeating units being from either conjugated dienes or halogen containing repeating units such as chloroprene, which are used to accelerate phenolic cure systems. In one embodiment all of the butyl rubbers consist essentially of isobutylene polymers without halogenated (e.g. brominated) repeating units from para-methylstyrene. For the purposes of this specification the term consisting essentially of with respect to isobutylene polymers not containing brominated repeat units from para-methylstyrene will define rubbers wherein the physical properties of the bladders derived therefrom do not vary a measurable amount (outside of experimental error in measurement) in the peel adhesion tests from a bladder made without a polymer having brominated repeat units from paramethylstyrene.

Small amounts (e.g. less than 10 or 20 weight percent of all rubbery polymers) of general purpose diene based elastomers, such as neoprene rubber, may be included as cure accelerators or for other purposes. Neoprene rubber (also known as poly(chloroprene)) is often added as a common cure accelerator in rubber formulations using resin cure systems as described below. In rubber formulations the neoprene is counted towards the 100 parts by weight rubber even though it has a separate function as a cure accelerator, e.g. it functions as a halogen containing elastomer for the cure system. If a halogenated isobutylene polymer is present there may be no need for an additional halogen source such as neoprene rubber.

The butyl rubber bladder can be cured with sulfur cure or resin cure systems or combinations thereof Resin containing curing agents are preferred with isobutylene polymers having residual unsaturation. Representative resins for curing include conventional phenolic resins (resorcinol or phenol-formaldehyde) which are used in an amount from about 1 to about 10 or 15 PHR. Several examples herein use combinations of phenol-formaldehyde, sulfur and sulfur accelerators as curatives. Such cure systems for bladder compositions are well known to those having skill in the art. For an example, see U.S. Pat. No. 3,031,423 which is hereby fully incorporated by reference. Reactive phenol-formaldehyde resins for curing butyl rubbers are commercially available from suppliers such as Schenectady International in Schenectady, N.Y. and are well known to the art.

If a sulfur cure system is to be used the amount of sulfur is desirably from 0.1 to 10 (PHR) parts by weight per 100 parts rubber. Representative of sulfur vulcanizing agents include sulfur; sulfur donating agents, for example amine disulfide, polymeric polysulfide, or sulfur olefin adducts. Preferably the amount of sulfur is between 0.5 and 7 PHR.

Accelerators for sulfur cured systems may be used in amounts from 0.1 to 5 PHR and more desirably from 0.5 to 2.5 PHR. These types of accelerators are well known and include amines (e.g. hexamethylenetetramine), disulfides, guanidines, thioureas, thiols, thiazoles, thiurams, sulfenamides, dithiocarbamates and xanthates. As classes, many of these accelerators are either too fast or too slow for curing bladder systems but they may be used in small amounts or specific compounds in each group may be appropriate for use in curing bladders. Blends of two or more accelerators may also be used. Scorch inhibitors may be used to extend the mixing time before curing starts. The inhibitors are commercially available and have little effect on the final properties of bladder.

The cured rubber composition of the curing bladder may also contain conventional additives including fillers, peptizing agents, stearic acid, accelerators, sulfur vulcanizing agents, reactive resins for curing, antiozonants, antioxidants, processing oils, activators, initiators, plasticizers, waxes, prevulcanization inhibitors, extender oils, and the like.

Fillers include reinforcing fillers such as carbon black which may be used in amounts from about 10 or 25 to about 75 or about 85 PHR or even 100 PHR. Typical carbon blacks that are used include acetylene blacks, N110, N121, N220, N231, N234, N242, N293, N299, N326, N330, M332, N339, N343, N347, N351, N358, N375, N472, N539, N550, N660, N683, N754, and N765. Reinforcing type fillers (such as carbon black) are preferred for use in curing bladders. Silica may be used in addition to carbon black.

Antioxidants and antiozonants may desirably be added to the curing bladder composition. Antioxidants prevent oxidative crosslinking or oxidative chain scission so that the modulus and fracture properties of the rubber are unchanged during exposure to oxidation especially at elevated temperatures. Antioxidants for rubber compounds in general and for butyl rubber more specifically are well known to the art. Desirable amounts are from 0.1 to 10 PHR and more desirably from about 2 to 6 PHR. Antiozonants are compounds that prevent chain scission due to exposure to ozone. They are also well known to the art. Antioxidants and antiozonants include monophenols, bisphenols, thiophenols, polyphenols, hydroquinone derivatives, phosphites, phosphate blends, thioesters, naphthylamines, diphenolamines, as well as other diaryl amine derivatives, paraphenylene diamines, quinolines and blended amines.

Various additional oils and waxes may be used in a curing bladder formulation. Depending upon the compatibility of the oils and waxes with the butyl rubber and the other components of the rubber formulation, they may be uniformly dispersed or they may purposefully tend to phase separate from the composition (migrate to the surface). Waxes include microcrystalline wax and paraffin wax. Oils include aliphatic, naphthenic and aromatic resins, polyethylene glycol, petroleum oils, ester plasticizers, vulcanized vegetable oils, castor oil, pine tar, phenolic resins, petroleum resins, polymeric esters, and rosins. Oils and waxes can be used in amounts up to 20 PHR and more desirably from about 1 to 10 PHR. Fatty acids such as stearic acid, palmitic acid and oleic acid may be used in amounts from about 0.1 to 5 PHR, with a range of from about 0.2 to 1 PHR being preferred. Zinc oxide may be present in amounts from about 0.5 PHR to about 10 PHR.

A procedure for mixing and molding curing bladders in general and for the examples is given below. In a Banbury mixer or the equivalent (e.g. high shear mixer such as a two roll mill) the rubbery polymers, a substantial portion of the carbon black, the Igepal CO-630 (if present), the oils, and zinc oxide were mixed until the mix temperature reached about 165° C. The material was dumped onto a sheet-off mill and cooled. The cooled material was added to a Banbury mixer or equivalent in the second mixing stage. Then the residual carbon black and processing aids were added during mixing until the Banbury mix temperature reached about 150° C. The material was again dumped onto a sheet-off mill and cooled. In the third and fourth mixing stages the curatives (including any phenolic resin, accelerators, and sulfur) were added and mixed until the mix temperature reached about 115° C. The material was dumped and cooled subsequent to the third and fourth stages.

The curing bladder may be molded in an injection molding machine, transfer molding machine or compression molding machine. The material from the Banbury may be extruded as a slug. A Monsanto rheometer is used to determine the approximate time to develop optimal cure at specific temperatures. The actual cure time will depend on heating rate and the gauge (thickness) of the curing bladder. The curing bladder desirably will have a toroidal shape. The curing bladder material tested in the examples was cured for 30 minutes at 185° C.

The curing bladders of this invention are useful for molding and curing various hydrocarbon rubber compositions including pneumatic vehicle tires and miscellaneous pneumatic tires for other applications. Other rubbery articles which can be cured in bladder equipped curing presses include hoses, various sleeves, and air springs (a shock absorbing spring used in heavy commercial vehicles). The curing bladders have good lubricity, desirable release characteristics from cured hydrocarbon rubbers, and extended lifetimes (cycles to failure) due to their enhanced release characteristics.

Typical properties of a curing bladder as produced are desirably a 300 percent Modulus of 3.0 to 8.0 MPa, a Breaking Strength of 5 to 14 MPa, an Elongation at Break of 400 to 1,000 percent, a Shore A Hardness at 100° C. of 35 to 65, a Hot Tension Set by ASTM D412 (16 hrs at 50 percent elongation at 190° C.) of 5 to 25 percent, and a Hot Peel Adhesion to a butyl rubber innerliner of 30 to 100 N. More desirably the curing bladder has a 300 percent Modulus of 3 to 6 MPa, a Breaking Strength of 8 to 11 MPa, an Elongation at Break of 600 to 900 percent, a Shore A Hardness at 100° C. of 35 to 50, a Hot Tension Set of 8 to 22 percent, and a Hot Peel Adhesion of 30 to 100N. The properties of a curing bladder after aging 24 hours at 191° C. in air desirably include an Elongation at Break of 250 to 600 percent more desirably 275 to 500 percent, a 300 percent Modulus of 4.0 to 8.0 MPa, a Breaking Strength of 4.5 to 8.0 MPa, a Shore A hardness at 100° C. of 55 to 75.

The following Table I shows a compounding recipe for Controls A and B and Examples I and II, which are curing bladder compositions. The isobutylene rubbery polymer in Control A and Example I is a standard butyl rubber having a Mooney viscosity ML(1+8)@ 125° C. of 51±5. The isobutylene rubbery polymers of Control B and Example II are blends of a standard butyl rubber with a copolymer of isobutylene and paramethylstyrene which has been brominated.

TABLE I

Effect of Igepal CO-630 on the Physical Properties and Release of Standard Butyl and 65/35 Standard Butyl/Exxpro Blends

|  | Control A | Example I | Control B | Example II |
|---|---|---|---|---|
| Exxpro ™ Butyl | — | — | 35.00 | 35.0 |
| Standard Butyl | 95.0 | 95.0 | 65.00 | 65.0 |
| Carbon Black | 55.0 | 55.0 | 57.5 | 57.5 |
| Processing oil | 6.0 | 6.0 | 10.00 | 10.00 |
| Igepal CO-630 | — | 5.0 | — | 5.00 |
| Phenolic resin | 9.0 | 9.0 | 9.00 | 9.00 |
| ZnO | 5.0 | 5.00 | 5.00 | 5.00 |
| Neoprene Rubber | 5.00 | 5.00 | 3.25 | 3.25 |
| Physical Properties after curing 30 min. at 185° C. | | | | |
| 100% Modulus MPa | 1.63 | 1.22 | 1.48 | 1.25 |
| 300% Modulus MPa | 5.06 | 3.36 | 4.65 | 3.37 |
| Break Strength MPa | 10.33 | 8.72 | 10.35 | 8.40 |
| % Elongation at Break | 713 | 813 | 742 | 828 |
| Shore A Hardness at 23° C. | 59 | 54 | 57 | 52 |
| Shore A Hardness at 100° C. | 46 | 39 | 43 | 36 |
| Peel adhesion from tire innerliner, Newtons | 99 | 35 | 98 | 55 |
| Hot Tension Set % | 9 | 7 | 8 | 17 |
| Hot PG Flex 95° C | no cracks after 240 min. of flexing | no cracks after 240 min. of flexing | no cracks after 240 min. of flexing | no cracks after 24 min. of flexing |
| Physical Properties after Aging 24 hrs at 191° C. in air | | | | |
| 100% Modulus MPa | 3.28 | 2.54 | 2.89 | 2.26 |
| 200% Modulus MPA | 5.71 | 4.33 | 4.93 | 3.46 |
| 300% Modulus MPa | 7.85 | 6.31 | 6.73 | 4.88 |
| Break Strength MPa | 7.92 | 7.12 | 6.90 | 5.91 |
| % Elongation at Break | 318 | 384 | 333 | 424 |
| Shore A Hardness at 23° C. | 80 | 74 | 77 | 70 |
| Shore A Hardness at 100° C. | 65 | 60 | 62 | 56 |

*Exxpro butyl is a copolymer of isobutylene and paramethylstyrene which is about 94 weight percent isobutylene and about 5 weight percent paramethyl styrene and about 1 weight percent bromine which is primarily present on the paramethyl group as a result of bromination. The material has a Mooney viscosity ML(1 + 8) 125° C. of 50 ± 10. It is available from Exxon.

A brominated isobutylene and paramethylstyrene (Exxpro™ butyl) was used as part of the isobutylene rubbery polymer in both Control B and Example II. Reactive phenol-formaldehyde curatives were used along with sulfur type curatives. The brominated isobutylene andparamethylstyrene may serve as a halogen source for phenolic resin curing. There was a slight decrease in the modulus and break strength from the addition of Igepal™ CO-630. Igepal CO-630 is a nonylphenoxypoly (ethyleneoxy) ethanol with about 9 ethyleneoxy units, about 60+ wt % ethyleneoxy and an HLB of about 13. It is available from Rhône-Poulenc in Cranbury, N.J. The Hot Peel Adhesion to a halobutyl rubber innerliner was measurably lower, only 35 percent (35/99) in Example I as compared to Control A and only 56 percent (55/98) in Example II as compared to Control B. This will result in bladders that need less frequent applications of mold lubricant or have increased useful lives.

The tensile tests on the samples are well known to the art and were used to generate the modulus, break strength, and elongation values.

The Hot Peel Adhesion test measures interfacial adhesion between two different substrates at 95° C. Interface modifiers (also called lubricants) if desired are added to the interface of the bladder substrate before the test is made. These include an emulsifiable silicone oil dispersed in water and thickened with a fumed silica. The bladder material is mixed and with a fabric backing is cured in a mold for 30 minutes at 185° C. A Mylar™ (polyester) sheet having laterally placed windows cut therein (5 mm wide by 100 mm longer) is placed between the cured bladder material having a fabric backing applied thereto and a second substrate which is an uncured tire innerliner material. The innerliner composition comprises at least 70 PHR bromobutyl rubber (e.g. 2.1 percent bromine and ML+4 @ 125° C. of 40±4) up to 30 PHR of other rubbers about 50 to 60 PHR of a GPF carbon black such as N660, about 18 PHR of processing aids such as alkylated naphthenic and aromatic hydrocarbons and naphthenic and aromatic process oils, about 2 PHR of zinc oxide, about 1.5 PHR of accelerators such as 4-morpholinyl-2-benzothiazyldisulfide and about 0.5 PHR of sulfur. The window in the Mylar™ sheet creates a known area of interfacial adhesion between the bladder sample and the other substrate (such as the tire innerliner sample). A fabric backing is applied to the tire innerliner material. The assembled sample of the two substrates (bladder and tire innerliner) with their fabric backing and Mylar sheet undergo a curing cycle where the second substrate is cured in a diaphragm curing mold for 28 minutes at 150° C. with 100 psi pressure (0.69 MPa). The fabric backing is adhered to the tire innerliner during curing. After this process the assembled sample is cut in 1 inch (2.54 cm) wide strips with the window portion of the Mylar longitudinal and centered therein, thereafter the two substrate materials are separated slightly by hand operation. They are then mounted in an Instron™ type force displacement tester in a configuration such that the peel angle between the separated substrates is 180°. The force displacement tester separates the substrates at a rate of 51 mm/min and records the force used. The average force used over the adhered area divided by the sample width is recorded as the adhesion value.

The curing bladders described herein are useful in bladder or diaphragm type curing press to cure a hydrocarbon rubber composition and preferably a pneumatic tire. These presses desirably have one or more molding surfaces besides the diaphragm or bladder. The uncured hydrocarbon composition is placed in the mold, the mold is closed, and the bladder or diaphragm is inflated (expanded usually with a heated gas such as steam). This sandwiches the uncured composition (desirably a green tire) between the bladder or diaphragm and the one or more other mold surfaces. The hydrocarbon rubber typically flows and conforms to the one or more other mold surfaces which are often a metal or alloy thereof and rather rigidly fixed during the molding operation. Further heating of the uncured composition causes it to cure (also called vulcanization or crosslinking) which solidifies the final shape of the molded part (cured composition) conforming to the one or more rigid mold surfaces. The bladder or diaphragm is then deflated (removing the internal pressure) to facilitate removal of the molded parts. Depending on the shape of the article (molded part), one or more of the other molding surfaces may physically move to open the mold, thereby further facilitating part removal.

While in accordance with the patent statutes the best mode and preferred embodiment have been set forth, the scope of the invention is not limited thereto, but rather by the scope of the attached claims.

What is claimed is:

1. In a curing press for a rubber composition which uses an expandable bladder to assist in shaping and curing said rubber composition, wherein the bladder is made from crosslinking a rubber formulation including one or more crosslinkable rubbery polymers, wherein at least 50 weight percent of said rubbery polymers of said bladder are at least one isobutylene rubbery polymer having at least 80 weight percent repeating units from isobutylene;

one or more curatives for said one or more rubbery polymers;

the improvement wherein the bladder further comprises from about 2 to about 15 parts by weight of a mono or poly(alkyl)phenoxypoly(alkyleneoxy)alkanol dispersed throughout said bladder, and wherein said parts by weight are based on 100 parts by weight of said rubbery polymers in the rubber bladder formulation.

2. In a curing press according to claim 1, wherein at least 80 weight percent of said rubbery polymers of said bladder formulation is at least one isobutylene copolymer consisting essentially of repeating units from isobutylene and repeat units from one or more conjugated dienes of 4 to 8 carbon atoms, and wherein said alkyleneoxy of said mono or poly(alkyl)phenoxypoly(alkyleneoxy)alkanol is ethyleneoxy.

3. In a curing press according to claim 2, wherein at least 90 weight percent of said rubbery polymers of said bladder formulation consists essentially of repeat units from isobutylene and repeat units from one or more conjugated dienes of from 4 to 8 carbon atoms.

4. In a curing press according to claim 2, wherein said rubbery polymers of said bladder consist essentially of at least 90 weight percent repeating units from isobutylene and from about 1 to 10 weight percent repeating units from conjugated dienes of 4 to 8 carbon atoms, and optionally up to 10 weight percent halogenated repeating units other than brominated para-methylstyrene.

5. In a curing press according to claim 2, wherein said mono or poly(alkyl)phenoxypoly(alkyleneoxy)alkanol has on average from 5 to 30 ethyleneoxy repeating units and said mono or poly (alkyl) of said mono or poly(alkyl)phenoxypoly(alkyleneoxy)alkanol is a single octyl or nonyl group.

6. In a curing press according to claim 5, wherein said curing press is designed to shape and cure rubber compositions into pneumatic tires.

7. An expandable curing bladder comprising:

one or more rubbery polymers, wherein at least 50 weight percent of said rubbery polymers are at least one isobutylene rubbery polymer having at least 80 weight percent repeating units from isobutylene;

from about 2 to about 15 PHR of a mono or poly (alkyl)phenoxypoly(alkyleneoxy)alkanol dispersed throughout said bladder, wherein said alkyl has from 6 to 12 carbon atoms and said alkylene has from 2 to 3 carbon atoms; and one or more curatives for said rubbery polymers, wherein PHR is parts by weight based upon 100 parts by weight of said one or more rubbery polymers in said bladder.

8. An expandable curing bladder according to claim 7, wherein said alkylene is ethylene, and said poly (ethyleneoxy) has from 5 to 30 repeat units.

9. In a method of using an expandable rubber bladder to cure an uncured rubber composition, said method including the sequential steps of:

inserting an uncured rubber composition into a curing press having an expandable rubber bladder positioned therein and having one or more molding surfaces, expanding said expandable rubber bladder by filling the internal portion of said bladder with a fluid to expand the bladder outwardly against an inner surface of the uncured rubber composition to force said uncured rubber composition against said one or more molding surfaces, curing the rubber composition into a cured article under conditions of heat and pressure, and deflating said expandable rubber bladder and removing the cured article from said curing press, the improvement wherein the expandable bladder comprises:

one or more rubbery polymers at least 50 weight percent being of at least one rubbery isobutylene polymer having at least 80 weight percent repeating units from isobutylene;

from about 2 to about 15 parts by weight of mono or poly(alkyl)phenoxypoly(alkyleneoxy)alkanol dispersed throughout said bladder, wherein said alkyl has from 6 to 12 carbon atoms and said alkylene has from 2 to 3 carbon atoms, wherein said parts by weight are based upon 100 parts by weight of said one or more rubbery polymers in said bladder.

10. A method according to claim 9, wherein said rubber composition being cured is a pneumatic tire.

11. In a curing press for a rubber composition which uses an expandable bladder to assist in shaping and curing said rubber compositions, wherein the bladder is a crosslinked rubber bladder formulation which includes:

one or more rubbery polymers, wherein at least 50 weight percent of said rubbery polymers of said bladder are at least one isobutylene rubbery polymer having at least 80 weight percent repeating units from isobutylene;

the improvement wherein the bladder formulation comprises about 2 to about 15 parts by weight of mono or poly(alkyl)phenoxypoly(alkyleneoxy)alkanol, wherein said alkyl has from 6 to 12 carbon atoms and said alkylene has from 2 to 3 carbon atoms.

* * * * *